June 20, 1939.  H. F. SMITH  2,162,759
STEERING WHEEL HUB STRUCTURE
Filed Sept. 11, 1937  3 Sheets-Sheet 1
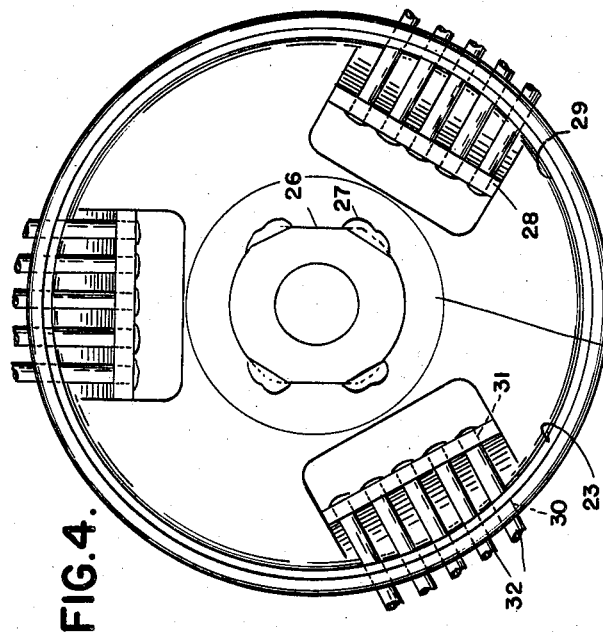
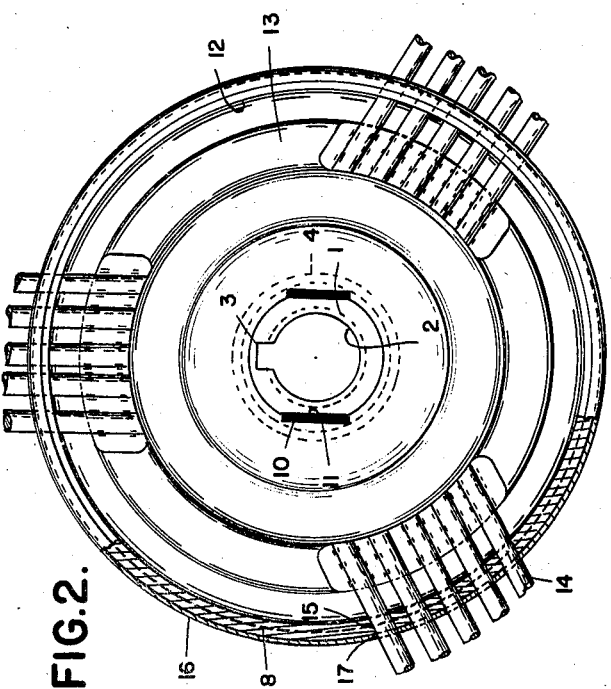
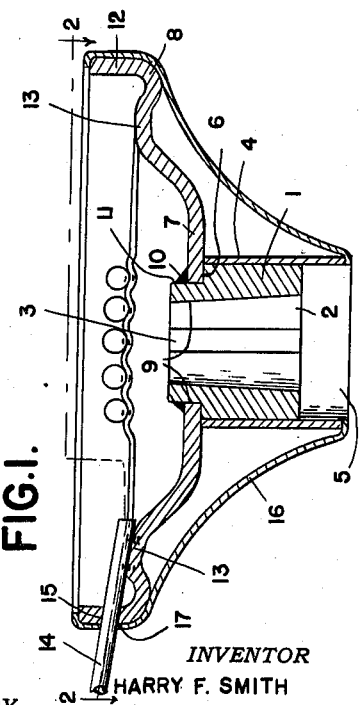
INVENTOR
HARRY F. SMITH
BY
ATTORNEYS June 20, 1939.  H. F. SMITH  2,162,759
STEERING WHEEL HUB STRUCTURE
Filed Sept. 11, 1937   3 Sheets-Sheet 2
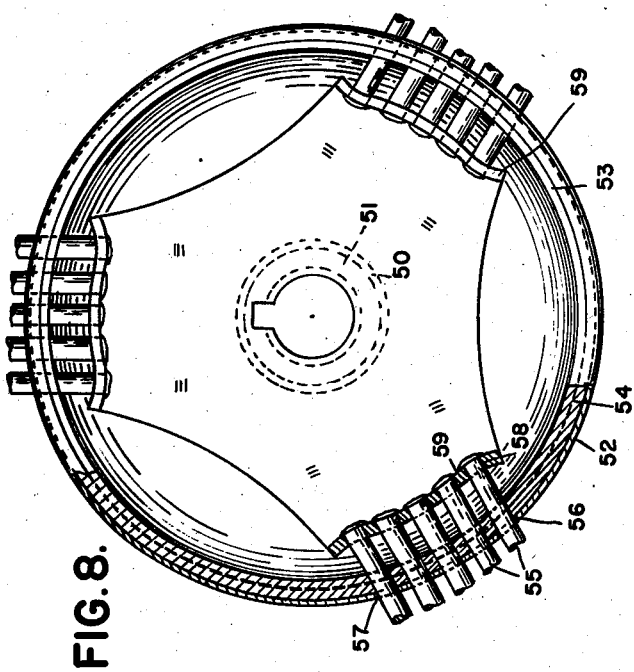
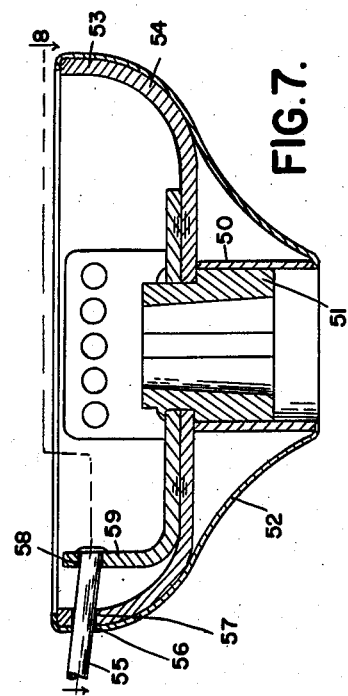
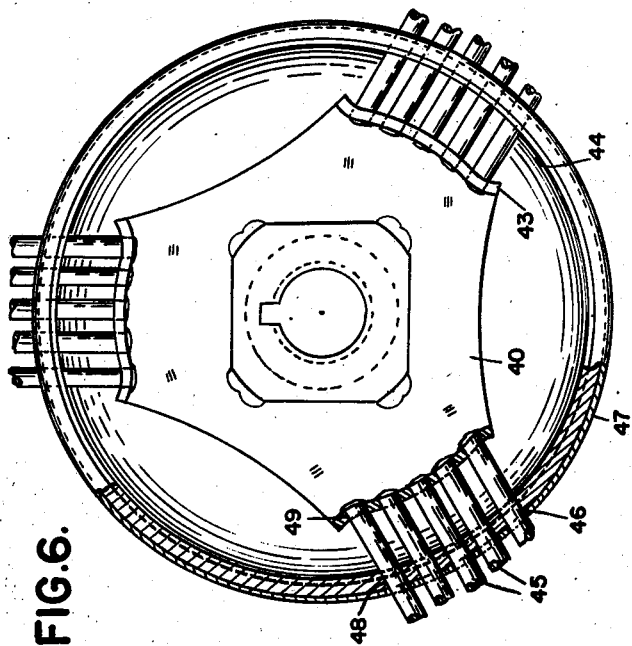
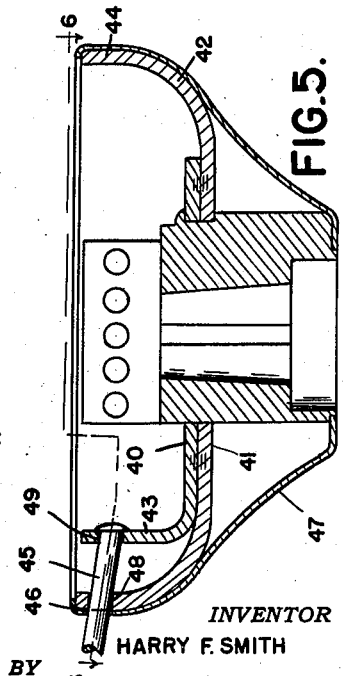
INVENTOR
HARRY F. SMITH
BY
ATTORNEYS June 20, 1939.   H. F. SMITH   2,162,759
STEERING WHEEL HUB STRUCTURE
Filed Sept. 11, 1937   3 Sheets—Sheet 3
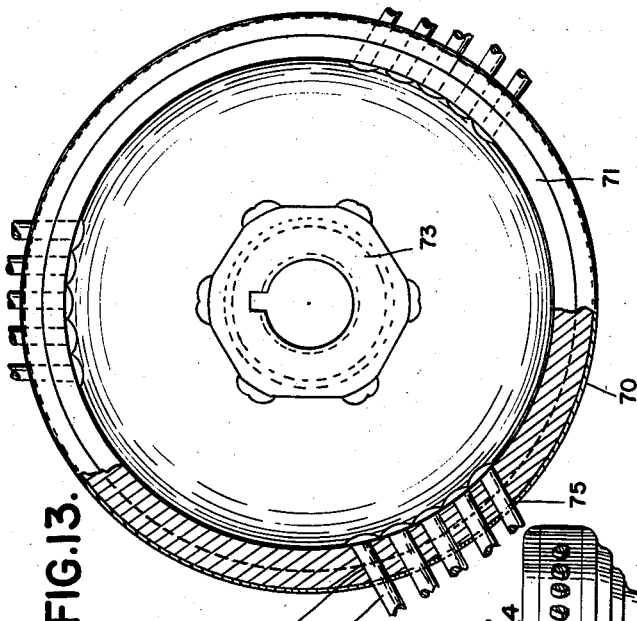
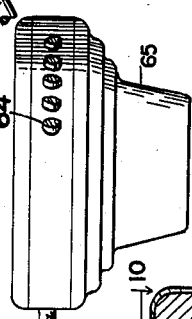
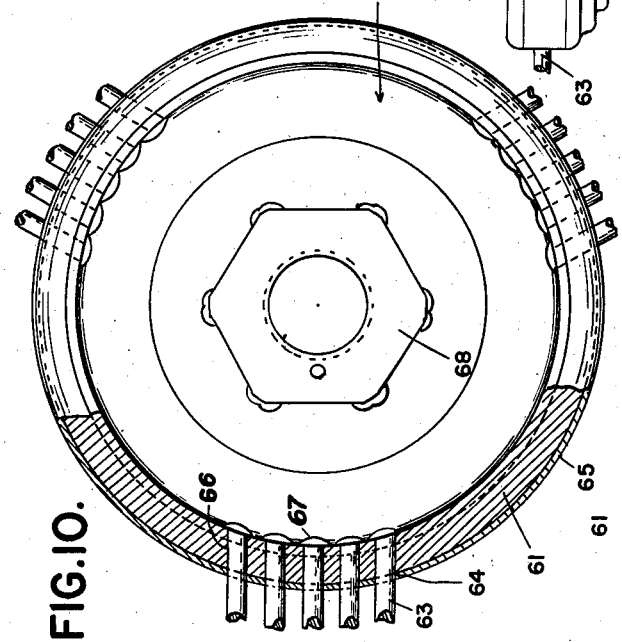
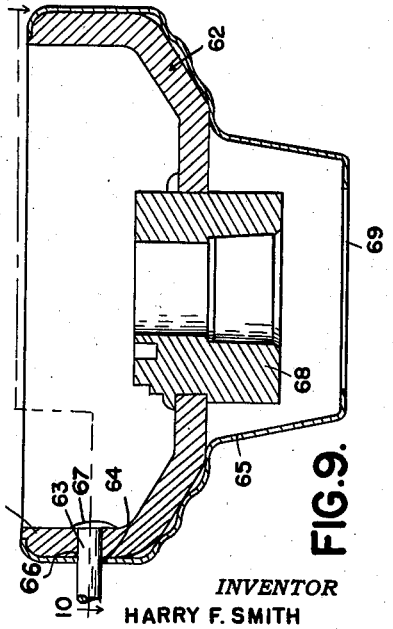
INVENTOR
HARRY F. SMITH
BY
*Whittemore Hulbert & Belknap*
ATTORNEYS

UNITED STATES PATENT OFFICE 2,162,759

STEERING WHEEL HUB STRUCTURE

Harry F. Smith, Toledo, Ohio, assignor to The Acklin Stamping Company, Toledo, Ohio, a corporation of Ohio Application September 11, 1937, Serial No. 163,465

17 Claims. (Cl. 74—552)

This invention relates generally to vehicle steering wheels and refers more particularly to the hub structure thereof and to the connections between the hub and the spokes or other suitable elements employed for supporting the wheel rim.

One of the essential objects of the invention is to provide a hub structure in which the spokes have a substantial bearing and secure anchorage, so that the assembly is rigid and sturdy.

Another object is to provide a hub structure wherein the connections between the spokes and hub are concealed within the latter.

Another object is to provide a hub structure that has an improved appearance and is economical to manufacture.

Other objects, advantages and novel details of construction of this invention will be made more apparent as this description proceeds, especially when considered in connection with the accompanying drawings wherein:

Figure 1 is a vertical sectional view through a hub structure embodying my invention and showing the inner ends of the spokes of the wheel applied thereto;

Figure 2 is a sectional view taken substantially on the line 2—2 of Figure 1;

Figure 3 is a view similar to Figure 1, but showing a slight modification;

Figure 4 is a top plan view of the structure illustrated in Figure 3;

Figure 5 is a view similar to Figure 3, but showing another modification;

Figure 6 is a sectional view taken substantially on the line 6—6 of Figure 5;

Figure 7 is a view similar to Figure 5, but showing another modification;

Figure 8 is a sectional view taken substantially on the line 8—8 of Figure 7;

Figure 9 is a view similar to Figure 7, but showing another modification;

Figure 10 is a horizontal sectional view taken substantially on the line 10—10 of Figure 9;

Figure 11 is a side elevation of the structure illustrated in Figures 9 and 10;

Figure 12 is a view similar to Figure 9, but showing another modification;

Figure 13 is a horizontal sectional view taken substantially on the line 13—13 of Figure 12.

Referring to Figures 1 and 2 of the drawings, wherein I have illustrated a preferred embodiment of my invention, 1 is the central hub member having the usual tapered bore 2 and keyway 3 for engagement with a suitable steering shaft (not shown), and 4 is a sheet metal sleeve on said hub member 1 and providing below the hub member a socket 5 for the head (not shown) of the steering collar. Preferably the hub member 1 is a screw machine part and is provided at its upper end with an annular shoulder 6. The sleeve 4 is formed from sheet metal and has its upper end substantially flush with the shoulder 6 so that said end and shoulder together form a seat for the base 7 of a pressed metal cup 8. As shown, the base 7 of this cup is provided at diametrically opposite points with flat portions 9 that engage and are brazed or welded as at 10 to similar flat portions 11 of the hub member 1 to prevent turning, and is provided at spaced points near the upstanding rim 12 of the cup with slightly arched portions 13 forming pads for suitable spokes such as 14. Preferably these arched portions or pads 13 are elongated and extend circumferentially of the base 7 opposite suitable openings 15 in the rim 12 for the spokes 14. To provide a neat appearance, the cup 8, sleeve 4 and hub member 1 are incased in a substantially frusto-conical sheet metal skirt 16 that is preferably crimped over the upper edges of the rim 12 of the cup and under the lower edges of the sleeve 4. The spokes 14 extend from the wheel rim (not shown) through suitable holes 17 in the skirt 16 and through the openings 15 in the rim onto the pads 13 on the base of the cup. Preferably these spokes 14 are welded to the pads 13 and may, if desired, be also welded to the rim 12 upon the inner side thereof. Thus, a very rigid, compact structure is provided.

In Figures 3 and 4 I have illustrated a slight modification wherein the hub member 20 is counterbored at 21 to receive the head (not shown) of the steering column, and the base 22 of the cup 23 rests only on a shoulder 24 of the hub member 20. Preferably the base 22 of the hub member has flat portions 25 that engage similar flat portions 26 of the hub member 20 to prevent turning, and is fixed to said hub member 20 by clinching portions 27 of the latter over said base 22. In this construction suitable ears 28 are turned up from the base 22 of the cup at spaced points thereof into substantially parallel relation to the rim 29, and aligned openings 30 and 31, respectively, are provided in said rim 29 and ears 28 for the spokes 32. The sheet metal skirt 33 is crimped over the upper edges of the rim 29 and under the hub member 20 to complete the hub structure. The spokes 32 extend through holes 34 in the skirt 33 and through the aligned openings 30 and 31, respectively, in the rim 29 and ears 28 and are welded to the latter.

In Figures 5 and 6 I have illustrated another modification which is similar to that illustrated in Figures 3 and 4 except a separate pressed metal spider 40 is used instead of the ears 28 to receive the inner ends of the spokes. As shown, the spider 40 is spot welded to the base 41 of the cup 42 and is provided with upturned portions 43 that are substantially parallel to the rim 44 of the cup. The spokes 45 extend through holes 46 in the skirt 47 and through aligned openings 48 and 49, respectively, in the rim 44 and upturned portions 43 and are welded to the latter.

In Figures 7 and 8 I have illustrated another modification which is similar to that illustrated in Figures 5 and 6 except a sheet metal sleeve 50 is used on a substantially cylindrical hub member 51, and the skirt 52 is crimped over the upper edges of the rim 53 of the cup 54 and under the lower edges of the sleeve 50. The spokes 55 extend through holes 56 in the skirt 52 and through aligned openings 57 and 58, respectively, in the rim 53 and upturned portions 59 of the spider 60 and may be welded to either or both the rim 53 and upturned portions 59, as desired.

In Figures 9, 10 and 11 I have illustrated another modification wherein the rim 61 of the cup 62 is sufficiently thick to provide, without pads, ears, spiders, etc., the necessary bearing for the spokes 63. In fact, the thickness of the rim 61 is substantially equal to the combined thickness of the rim 29 and adjacent ears 28 (Figure 3) or of the rim 44 and upturned portion 43 (Figure 5). Thus, with this construction the spokes 63 extend through holes 64 in the skirt 65 and through holes 66 in the rim 61 of the cup and are welded to said rim as at 67. In this construction the skirt 65 extends below and in spaced relation to the hub member 68 and has a suitable opening 69 for the head (not shown) of the steering column.

In Figures 12 and 13 I have illustrated a modification that is similar to that illustrated in Figures 9, 10 and 11 except that the skirt 70 is crimped over the upper edges of the rim 71 of the cup 72 and under the lower end of the central hub member 73. The spokes 74 extend through holes 75 in the skirt 70 and through openings 77 in the rim 71 of the cup and are welded to said rim.

Thus, in all of the constructions described, the spokes have a substantial bearing and are securely anchored in the hub structure. An extremely sturdy construction is provided and can be manufactured at a comparatively low cost.

What I claim as my invention is:

1. In a steering wheel, a hub structure having a central part provided with an opening for engagement with a steering shaft, a cup having its base non-rotatably anchored upon said part, and spokes entirely free of said part extending through openings in the rim of said cup and rigidly secured to portions of the base of said cup.

2. In a steering wheel, a hub structure having a screw machine part provided with an opening for engagement with a steering shaft and having an annular shoulder providing a reduced end portion, a pressed metal cup having its base non-rotatably sleeved upon the reduced end portion of said part and engaging said shoulder, a spider also sleeved upon the reduced end portion of said part within and secured to the base of said cup, said spider having upright portions spaced from the rim of said cup, and spokes entirely free of said screw machine part extending through openings in said rim and upright portions.

3. In a steering wheel, a hub structure having a central part provided with an opening for engagement with a steering shaft, a cup having its base non-rotatably mounted upon said part, a spider also mounted upon said part within and secured to the base of said cup, said spider having upright portions spaced from the rim of said cup, and spokes entirely free of said part extending through said rim and rigidly secured to the upright portions of said spider.

4. In a steering wheel, a hub having a central part provided with an opening for engagement with a steering shaft, substantially concentric members carried by said central part and provided with aligned openings, spokes engaging said aligned openings and free of said central part, and means for securing said spokes to one of said members.

5. In a steering wheel, a hub having a central part provided with an opening for engagement with a steering shaft, a cup having its base secured to said part, the rim of said cup having openings therein, the base of said cup having raised portions, and spokes engaging said openings and secured to the raised portions of said base.

6. In a steering wheel, a hub structure including a central part having an opening for engagement with a steering shaft, a cup having its base non-rotatably secured to said part, the base of said cup having struck-out portions substantially parallel to the rim of said cup, a metal skirt sleeved upon the rim of said cup and secured to said central part at its lower end, and spokes entirely free of said central part extending through aligned openings in said skirt, rim and struck-out portions.

7. In a steering wheel, a hub structure including a central part having an opening for engagement with a steering shaft and having an annular shoulder providing a reduced end portion, a sheet metal sleeve on said part and cooperating therewith to provide a socket for the head of a steering column, a pressed metal cup having its base non-rotatably sleeved on the reduced end portion of said part and engaging said shoulder, a pressed metal spider sleeved on the reduced end portion of said part within and welded to the base of said cup, said spider having upturned portions substantially parallel to the rim of said cup, a metal skirt sleeved on the rim of said cup and secured to said sleeve at its lower end, and spokes entirely free of said part extending through aligned openings in said skirt, rim and upturned portions.

8. In a steering wheel, a hub structure including a central part having an opening for engagement with a steering shaft and having an annular shoulder providing a reduced end portion, a pressed metal cup having its base non-rotatably sleeved on the reduced end portion of said part and engaging said shoulder, a sheet metal skirt sleeved on the rim of said cup and provided below said central part with a cup-shaped portion, the base of said cup-shaped portion having an opening for a steering column, and spokes entirely free of said machine part extending through registering openings in said skirt and rim of said cup.

9. In a steering wheel, a hub structure including a screw machine part having an opening for engagement with a steering shaft and having an annular shoulder providing a reduced end portion, a pressed metal cup having its base non-rotatably sleeved on the reduced end portion of said part and engaging said shoulder, a sheet metal skirt sleeved on the rim of said cup and secured to said screw machine part at its lower end, and spokes entirely free of said part extending through registering openings in said skirt and rim of said cup.

10. In a stering wheel, a hub structure including a member having an opening for engagement with a steering shaft, a sleeve on said member and cooperating therewith to provide a socket for the head of a steering column, a cup having its base non-rotatably secured to said member, the base of said cup being provided adjacent the rim of the cup with arched portions forming pads, a metal skirt sleeved upon the rim of said cup and secured to the sleeve aforesaid at its lower end, and spokes entirely free of said member extending through registering openings in the skirt and rim of said cup and fixed to said pads.

11. In a steering wheel, a hub structure including a member having an opening for engagement with a steering shaft, a cup having its base non-rotatably secured to said member, the base of said cup having struck-out portions substantially parallel to the rim of said cup, and spokes entirely free of said member extending through aligned openings in said rim and struck-out portions.

12. In a steering wheel, a hub structure including a member having an opening for engagement with a steering shaft, a cup having its base non-rotatably secured to said member, a metal spider mounted on said member within and welded to the base of said cup, said spider having upturned portions substantially parallel to the rim of said cup, a metal skirt sleeved upon the rim of said cup and secured to said member at its lower end, and spokes entirely free of said member extending through aligned openings in said skirt, rim and upturned portions.

13. In a steering wheel, a hub structure including a member having an opening for engagement with a steering shaft, a sleeve on said member and cooperating therewith to provide a socket for the head of a steering column, a cup having its base non-rotatably mounted on said member, a spider mounted on said member within and welded to the base of said cup, said spider having upturned portions substantially parallel to the rim of said cup, a skirt sleeved on the rim of said cup and secured to said sleeve at its lower end, and spokes entirely free of said member extending through aligned openings in said skirt, rim and upturned portions.

14. In a steering wheel, a hub structure including a member having an opening for engagement with a steering shaft, a cup having its base non-rotatably mounted on said member, a skirt sleeved on the rim of said cup and provided below said member with a cup-shaped portion, the base of said cup-shaped portion having an opening for a steering column, and spokes entirely free of said member extending through registering openings in said skirt and rim of said cup.

15. In a steering wheel, a hub structure including a central member, a cup having its base non-rotatably mounted on said member, a skirt sleeved on the rim of said cup and secured to said member at its lower end, and spokes entirely free of said member extending through registering openings in said skirt and rim of said cup.

16. In a steering wheel, a hub structure having a central member provided with an opening for engagement with a steering shaft, a substantially cup-shaped member having its base mounted on said member, the base of said cup-shape member being provided between said central member and the rim of said cup-shape member with arched portions forming pads, and spokes extending through the rim of said cup and fixed to said pads.

17. In a steering wheel, a hub structure having a central member provided with an opening for a steering shaft, a substantially cup-shape member having its base mounted on said central member, the base of said cup-shape member being provided in laterally spaced relation to the rim of said cup-shape member with upwardly extending portions, and spokes extending through the rim of said cup-shape member and rigidly secured to said upwardly extending portions.

HARRY F. SMITH.